United States Patent Office.

GERVAS EBY ROSE, OF PHILADELPHIA, PENNSYLVANIA.

Letters Patent No. 113,933, dated April 18, 1871.

IMPROVEMENT IN WELDING-POWDER FOR IRON, &c.

The Schedule referred to in these Letters Patent and making part of the same.

I, GERVAS EBY ROSE, of Philadelphia, county of Philadelphia, State of Pennsylvania, have invented an Improved Welding-Powder, of which the following is a specification.

I have found that bisulphate of soda, (sometimes termed nitrate cake,) the residuum of nitrate of soda in manufacturing nitric acid from the same, forms a cheap and effective flux, applicable especially to the welding of steel to iron, in place of the more expensive borax now commonly used for the same purpose.

I reduce the mass of bisulphate of soda to a granular or powdered condition, and apply it to the heated article precisely as other fluxes are applied, and I prefer to mix with the powder pulverized charcoal in the proportion of about one-third, by measure, of the quantity of bisulphate of soda. Charcoal, however, although preferable in most cases, may be dispensed with.

Claim.

The use of bisulphate of soda, with or without charcoal, as a welding-powder or flux.

In testimony whereof I have signed my name to this specification in the presence of two subscribing witnesses.

GERVAS E. ROSE.

Witnesses:
  WM. A. STEEL,
  FRANKLIN B. RICHARDS.